July 14, 1959

C. C. VEALE 2,895,037

TAPE WELDERS

Filed June 1, 1956

INVENTOR
C. C. VEALE
BY C. B. Hamilton
ATTORNEY

July 14, 1959
C. C. VEALE
2,895,037
TAPE WELDERS
Filed June 1, 1956
4 Sheets-Sheet 2
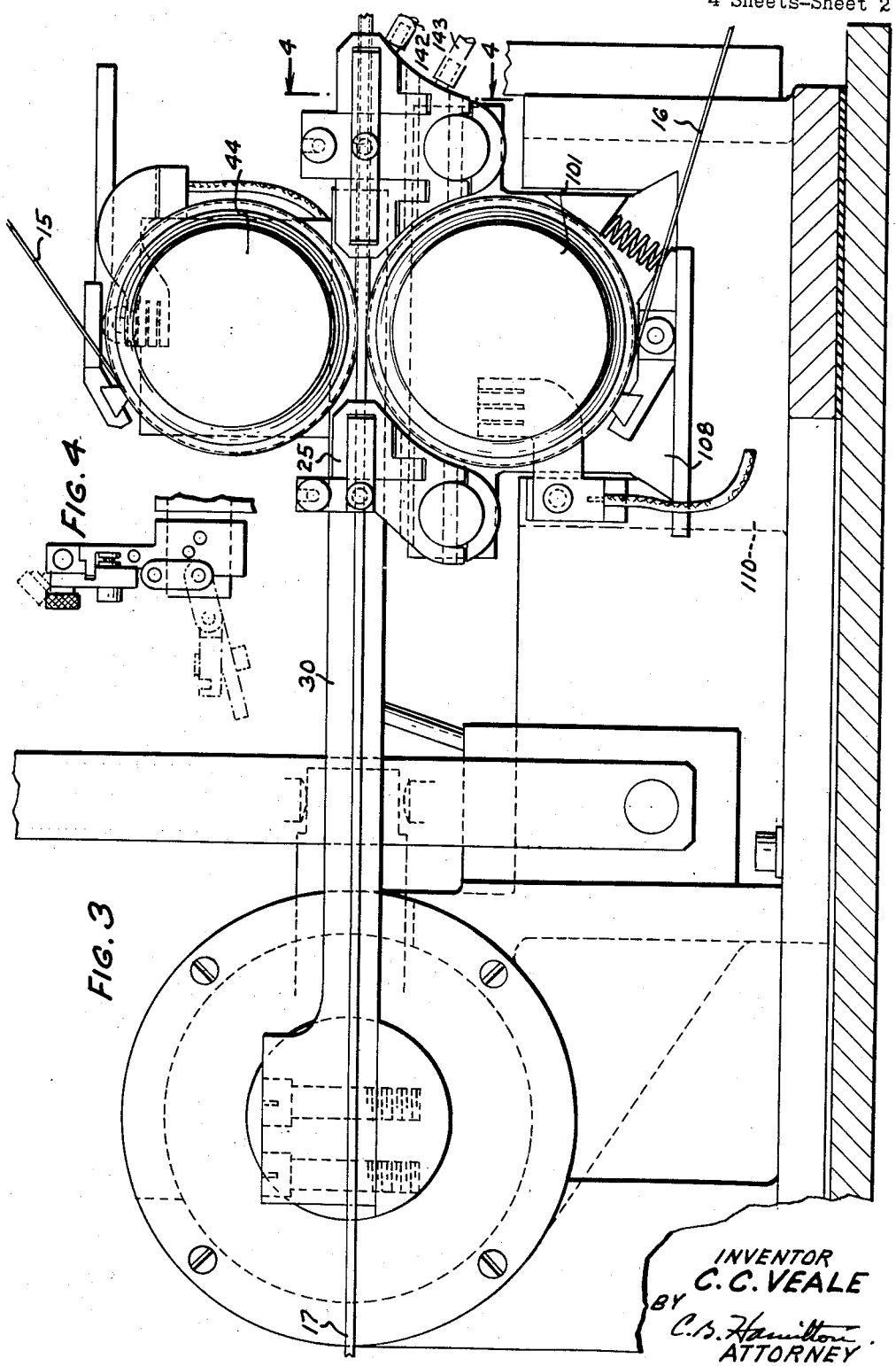
INVENTOR
C. C. VEALE
BY
C. B. Hamilton
ATTORNEY July 14, 1959
C. C. VEALE
2,895,037
TAPE WELDERS
Filed June 1, 1956
4 Sheets-Sheet 3
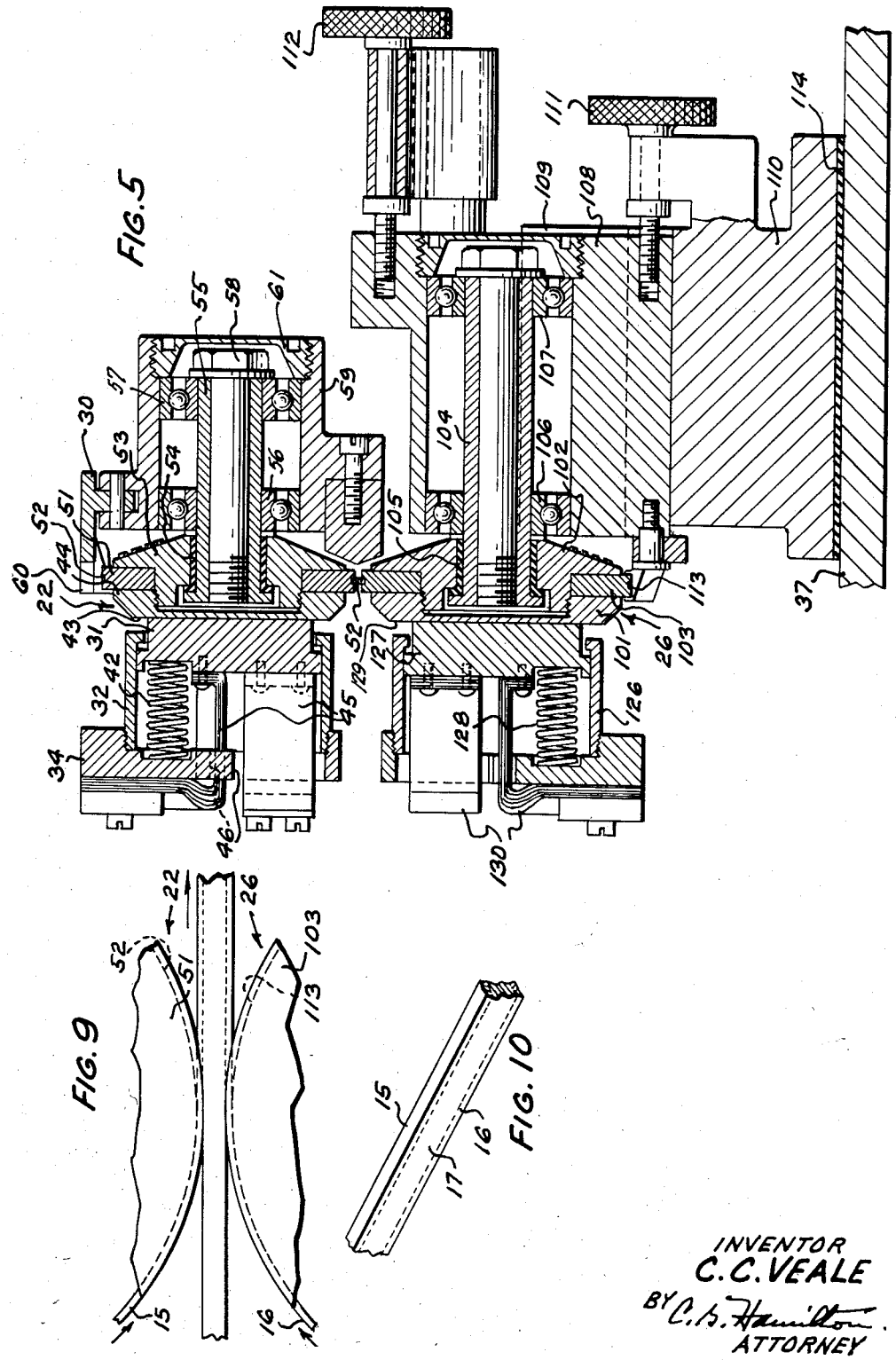
INVENTOR
C. C. VEALE
BY C. S. Hamilton
ATTORNEY July 14, 1959
C. C. VEALE
2,895,037
TAPE WELDERS
Filed June 1, 1956
4 Sheets-Sheet 4
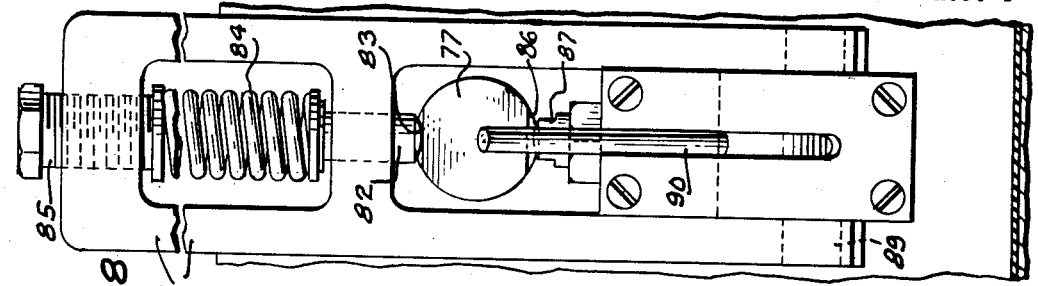
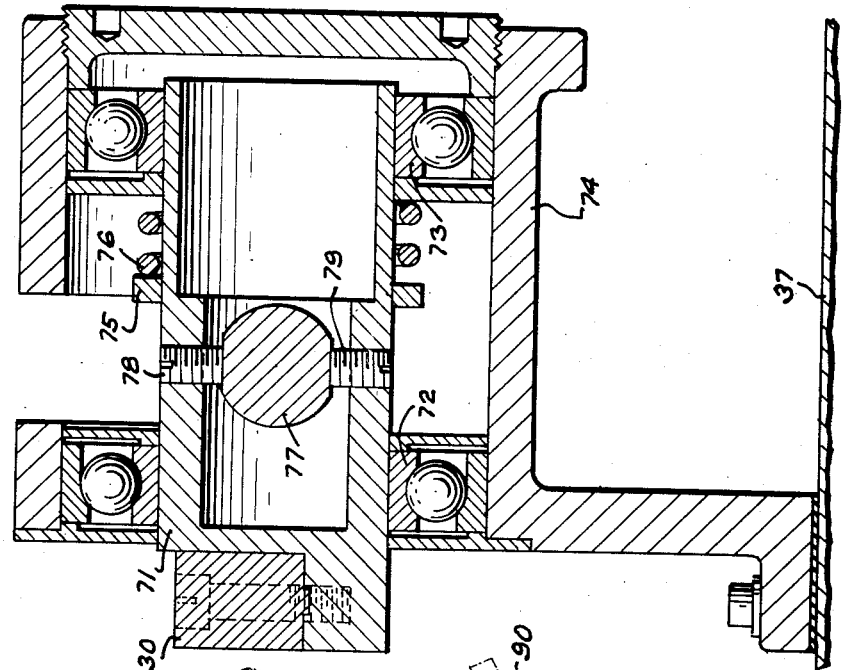
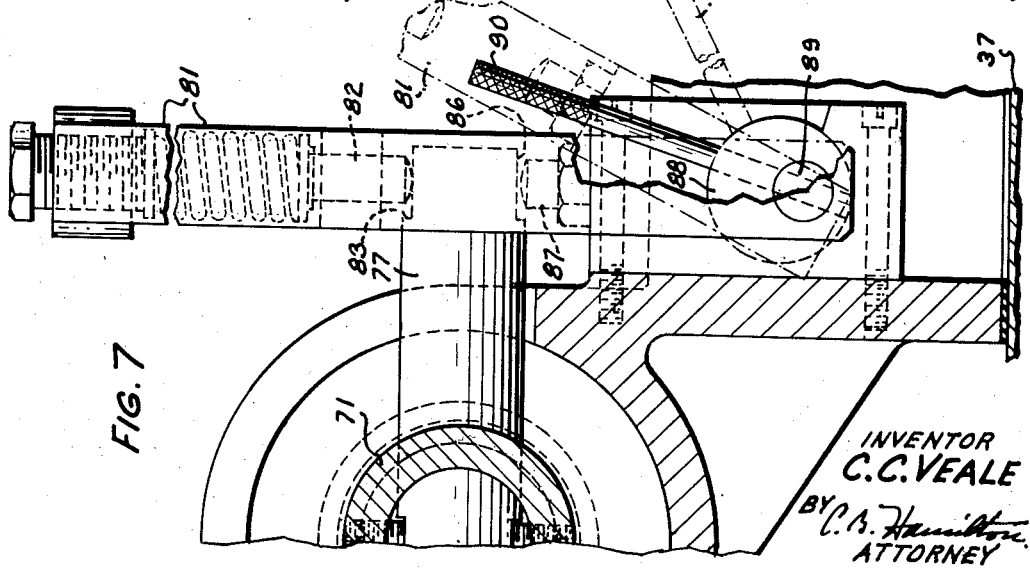
INVENTOR
C.C.VEALE
BY C.B. Hamilton
ATTORNEY United States Patent Office 2,895,037
Patented July 14, 1959

2,895,037

TAPE WELDERS

Charles C. Veale, West Chicago, Ill., assignor to Western Electric Company, Incorporated, New York, N.Y., a corporation of New York Application June 1, 1956, Serial No. 588,859

8 Claims. (Cl. 219—81)

This invention relates to tape welders, and more particularly to apparatus for welding precious metal tapes to opposite sides of a base metal tape.

In welding a tape continuously to a second tape with alternating current, it is necessary, to obtain uniform welding, to press the tapes together with a constant pressure. In the past, it has been difficult to maintain such pressure due to inertia of one or both welding electrodes.

An object of the invention is to provide new and improved roll welders.

Another object of the invention is to provide welders having minimum inertia electrodes.

A further object of the invention is to provide welders for welding flexible tapes to opposite sides of a stiff tape.

A welder illustrating certain features of the invention may include a first electrode, a second electrode movable toward and away from the first electrode and minimum inertia means urging the second electrode toward the first electrode.

A welder forming a more specific embodiment of the invention may include a pair of electrode rolls, one of which is stationary and the other is mounted on a light flexible lever arm selectively movable between a position urging the movable roll toward the stationary roll and a position retracting the movable roll so that the welder may be strung up with tapes to be welded together. Separate mounting means mount brushes which may be swung into engagement with the sides of the welding rolls to supply welding current thereto without adding to the mass of the lever arm.

A complete understanding of the invention may be obtained from the following detailed description of a welder forming a specific embodiment thereof, when read in conjunction with the appended drawings, in which Fig. 1 is a plan view of a welder forming a specific embodiment of the invention;

Fig. 3 is an enlarged, fragmentary vertical section taken along line 3—3 of Fig. 1;

Fig. 4 is an elarged vertical section taken along line 4—4 of Fig. 3;

Fig. 5 is an enlarged vertical section taken along line 5—5 of Fig. 1;

Fig. 6 is an enlarged vertical section taken along line 6—6 of Fig. 1;

Fig. 7 is an enlarged vertical section taken along line 7—7 of Fig. 1;

Fig. 8 is an enlarged vertical section taken along line 8—8 of Fig. 1;

Fig. 9 is a fragmentary elevational view taken along line 9—9 of Fig. 1, and

Fig. 10 is a fragmentary perspective view of a composite tape formed by the welder shown in Fig. 1.

Figure 2:
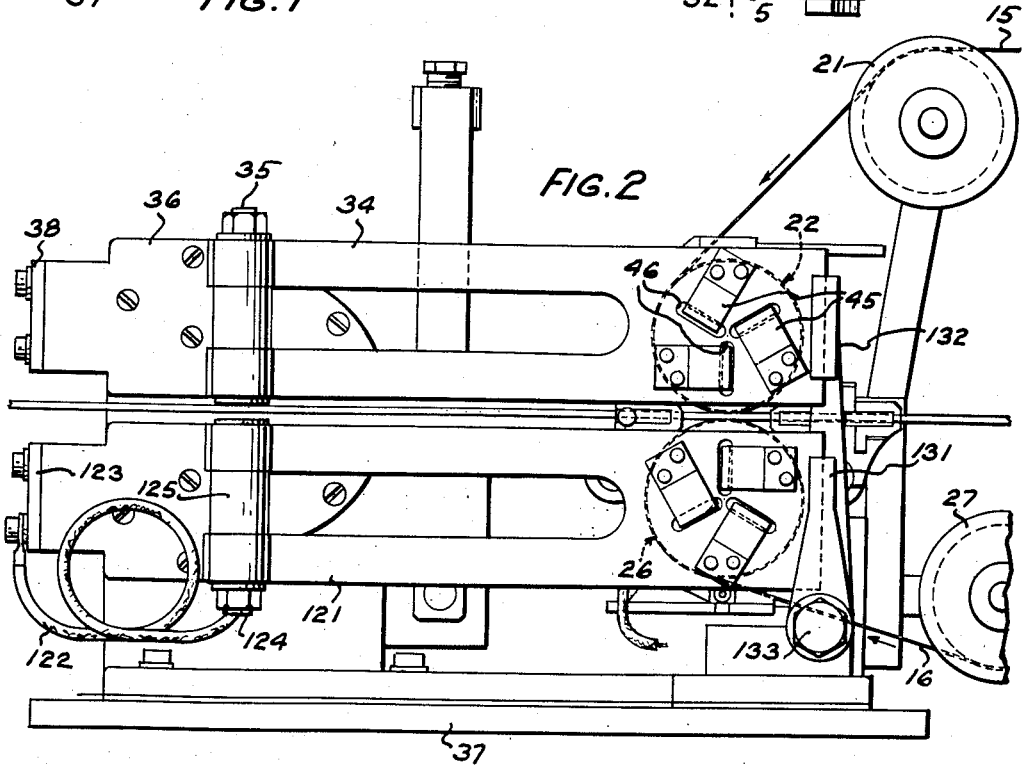
Fig. 2 is a fragmentary front elevation of the welder shown in Fig. 1.

Referring now in detail to the drawings, there is shown a welder for welding precious metal tapes 15 and 16 (Fig. 2) to a base metal tape or bar 17 simultaneously to form contact stock for stationary combs of wire spring relays or the like. The welder welds the tapes 15 and 16 continuously to the tape 17 with an alternating current supply. The tape 15 travels over a guide sheave 21 to a light weight roll or electrode 22 and travels around a large arc or portion of the periphery of the roll 22 into engagement with the bar 17. The bar 17 is guided by guides 25 (Fig. 3) between the roll 22 and a stationary roll or electrode 26 to which the tape 16 is guided by a sheave 27 from a suitable source of supply (not shown).

Figure 1:
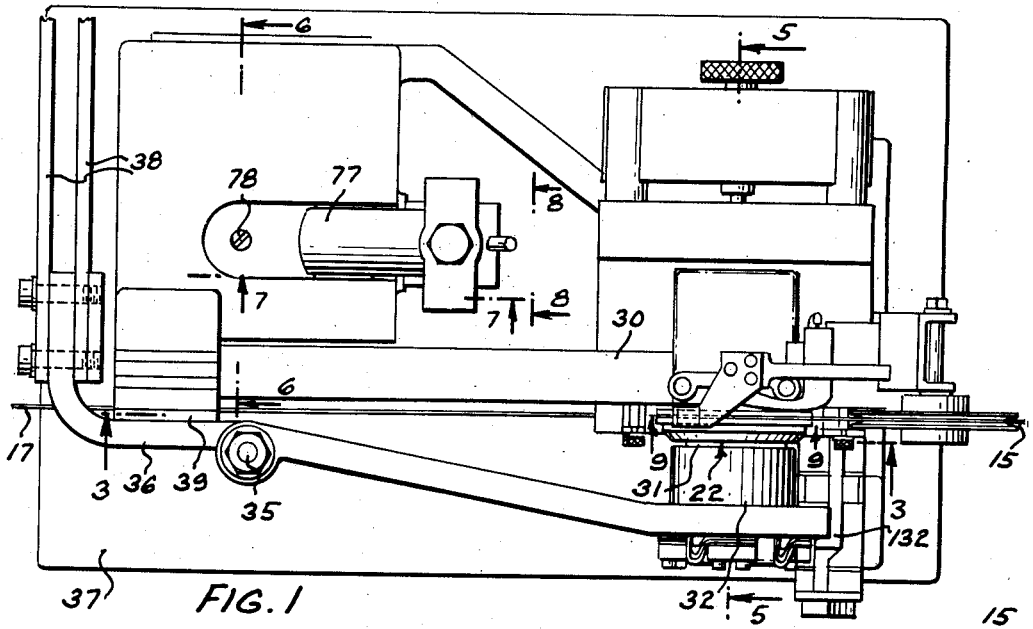

The roll 22 is urged toward the roll 26 which rotates on a fixed horizontal axis; a flexible cantilever arm 30 urging the roll 22 toward the roll 26 during the welding operation. The inertia of the load carried by the cantilever arm 30 is made as light as possible by mounting a brush 31 separately from the arm 30 and the roll 22 by a brush holder 32 (Fig. 5) mounted on an arm 34 pivoted on a pintle 35 (Fig. 1). The pintle 35 is mounted on a bracket 36 fixed to and insulated from a base 37 of the apparatus, and has highly conductive conductors 38 connected thereto, insulating blocks 39 connecting the bracket 36 to the welder. The brush 31 is urged by springs 42 to the right, as viewed in Fig. 5, against a face 43 of a clamping disc 44 of the electrode roll 22, and the brushes 31 are connected to an alternating current source (not shown) by flexible conductors 45 projecting through slots 46 in the arm 34.

The roll 22 includes a highly conductive contact ring 51 having a groove 52 therein for receiving the tape 15. The ring 51 is clamped between the disc 44 and a disc 53, the clamping disc 44 being threaded onto the disc 53 so that the ring 51 is securely held therebetween and good electrical connection is obtained between the disc 44 and the ring 51. The disc 53 is mounted on an insulating sleeve 54 on a mounting sleeve 55, whereby the entire roll 22 is spaced from and insulated from the mounting sleeve 55, which is mounted through the bearings 56 and 57 by a screw 58. The bearings 56 and 57 are mounted in a housing 59 carried by the arm 30, which has a presser 60 thereon to press the tape 15 in the groove in the roll 22. A cap 61 threaded into the housing 59 locates the bearing 57 in the housing 59.

The arm 30 is secured rigidly to a hollow shaft 71 (Fig. 6) which is rotatably mounted in radial and thrust bearings 72 and 73 fixed in a pillow block 74. A collar 75 rigidly secured to the hollow shaft 71 is urged to the left, as viewed in Fig. 6, by a compression spring 76 to take all end play out of the bearings 72 and 73 and precisely locate the shaft 71 longitudinally. An arm 77 is rigidly locked to the shaft 71 by set screws 78 and 79 and controls the position of the shaft 71 in the pillow block 74. A latching frame 81, Figs. 7 and 8, is movable between a releasing position shown in broken lines in Fig. 7 and a latching position shown in full lines in Fig. 7, and, when in latching position, holds the arm 77 in a position in which the electrode roll 22 is urged toward the electrode roll 26 and urges the tapes 15, 16 and 17 tightly together between the two electrode rolls. The frame 81 carries a pin 82 urged against a flat 83 on the arm 77 by a compression spring 84 whose force may be varied by an adjustment screw 85 to vary pressure on the tapes 15, 16 and 17. The pin 82 urges the arm 77 toward a pin 87, which is urged by a cam 88 rotatable on a pin 89 to a position holding the pin 87 in its extreme upward position. The pin 87 forms a stop keeping the electrode rolls apart whenever there are no tapes between the rolls, but ordinarily is not engaged by the cam 88. The frame 81 also may be swung in a clockwise direction, as viewed in Fig. 7, to retract the pin 87 away from the arm 77. An arm 90 is provided for rotating the cam 88, when in its operative position, forcing the pin 87 to its extreme upward position and retracted when inoperative.

The stationary roll 26 includes clamping discs 101 and 102 (Fig. 5) threaded together to electrically engage and securely clamp a ring 103 which guides the tape 16 to the bar 17 and supplies a potential to the tape 16. The disc 102 is mounted on and insulated from a mounting sleeve 104 by an insulating sleeve 105, and the sleeve 104 is mounted rotatably in radial and thrust bearings 106 and 107 which are mounted in a slide 108 slidable in a guideway 109 and a mounting block 110. The slide 108 may be adjusted relative to the mounting block 110 by thumb screws 111 and 112 to precisely align the groove 113 in the ring 103 with the groove 52 in the ring 51. The mounting block 110 is electrically insulated from the base 37 by a spacer 114 of an electrical insulating material. An arm 121 (Fig. 2) connected by a conductor 122 to a bus bar 123 is mounted pivotally on a pintle 124 held by a bracket 125 secured rigidly relative to the base 37 and mounts a cylindrical guide 126 (Fig. 5) having a brush 127 slidable therein. The brush 127 is urged by springs 128 against a face 129 of the clamping disc 101 and flexible leads 130 connect the electroconductive arm 121 to the brush 127.

An L-shaped latching arm 131 and an L-shaped latching arm 132 mounted pivotally on a pin 133 latch the arms 34 and 121 in positions in which the springs 42 and 128 urge the brushes 31 and 127 into good electrical contact with the discs 44 and 101. The brushes are supplied with current from the power source of opposite potentials so that the current flows from one of the rings 51 and 103 to the other through the tapes 15, 16 and 17, and the tapes 15 and 16 are welded to opposite faces of the tape or bar 17. The resulting product is advanced continuously to the right, as viewed in Fig. 10, by suitable means (not shown).

Cooling conduits 142 and 143 (Fig. 3) are provided for suitably cooling the tapes and the electrode by spraying water or the like on the electrodes if desired. The construction of the roll 22 and the elements mounting it rotatably on the arm 30 are as light as possible so that the composite structure carried by the arm 30 has very little inertia and can follow the variation in combined thickness of the tapes 15, 16 and 17, which variation is caused by the alternating current alternately softening the materials to be joined together more greatly and then less extensively. Consequently, the alternations in movement of the electrode 22 relative to the electrode 26 vary one hundred twenty times per second since the frequency of the current is sixty cycles per second. The inertia of the structure carried by the arm 30 also is kept to a minimum by mounting the brush 31 entirely separately from the electrode roll 22 so that only a very slight frictional force between the highly polished face 43 of the clamping disc 44 and the face of the brush 31 engaging the disc 44 is present.

If desired the roll 26 may be removed and a stationary shoe electrode substituted therefor for welding a single tape to a bar.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for welding metal tapes to opposite sides of a metal bar, which comprises a pair of grooved rolls for guiding said metal tapes into contact with a metal bar advanced therebetween, a resilient cantilever arm mounting one of the rolls, means for bending the cantilever in a direction such as to urge the roll carried thereby toward the other roll, and conductive brushes mounted independently of said cantilever for applying an electrical potential across the rolls.

2. An apparatus for welding metal tapes to opposite sides of a metal bar, which comprises a grooved roll for guiding a first metal tape into contact with a metal bar advancing therepast, a resilient cantilever arm, a second roll mounted on the free extremity of the arm for guiding a second metal tape into contact with the bar, means for bending the cantilever in a direction urging the second roll toward the first-mentioned roll, and electrical means including a brush mounted independently of the cantilever arm and engaging the second roll for applying an alternating current potential of a predetermined frequency across the rolls.

3. In a tape welder, a fixed electrode, a roll electrode, a cantilever spring arm mounting the roll electrode rotatably on the free extremity thereof, releasable holding means for bending said cantilever spring arm to resiliently urge said roll electrode toward said fixed electrode when engaged by said holding means, a power source, electrical means connecting one side of said power source to said fixed electrode, brush means for slidably engaging said roll electrode, means connecting said brush means to the other side of said power source, and means supporting the brush means independently of said roll electrode and said cantilever spring arm.

4. In a tape welder, a first electrode including a shaft and a disc fixed to one end of the shaft, bearing means mounting the shaft rotatably on a fixed axis, a second electrode including a shaft and a disc fixed to one end of the shaft, a spring-pressed arm mounted pivotally at one end thereof and having bearing means at the other end mounting the second-mentioned shaft rotatably, releasable means holding the arm in a position in which the second electrode is urged thereby toward the first electrode, first brush means for contacting the first electrode, second brush means, and means urging the second brush means into sliding contact with the second-mentioned disc on the opposite side thereof from the second-mentioned shaft.

5. In a welding apparatus, a base, a fixed electrode secured to said base, a resilient cantilever arm pivotally mounted on said base, a movable electrode secured to the free extremity of said cantilever arm, releasable means for latching said cantilever arm in such a position that the movable electrode is in contact with the fixed electrode and the cantilever arm is deflected whereby the electrodes are resiliently maintained in this relationship by the internal forces within said cantilever arm created by the deflection of said arm, contact means secured to said base and in slidable electrical contact with said movable electrode, and means for applying an alternating potential across said contact means and said fixed electrode.

6. In a welding machine, a stationary electrode, a rotatable shaft, a resilient arm fixed to and radially extending from the shaft, a movable electrode attached to the resilient arm for engaging articles to be welded between said electrodes, and latch means for holding the rotatable shaft in position to bend the resilient arm for urging said second electrode into contact with articles positioned between said electrodes.

7. An apparatus for welding metal tapes to opposite sides of a metal bar comprising fixed and movable rolls for guiding said metal tapes into contact with a metal bar advanced therebetween, a resilient cantilever arm mounting said movable roll, means for bending said cantilever in a direction such as to urge the roll carried thereby toward said fixed roll, conductive brushes mounted independently of said cantilever arm and pivotal toward and away from said rolls for applying an electrical potential across said rolls, and latch means for holding said brush means in engagement with said rolls.

8. An apparatus for welding metal tapes to opposite sides of a metal bar comprising a fixed grooved roll for guiding a first metal tape into contact with a metal bar advancing therepast, a resilient cantilever arm, a second grooved roll mounted on the free extremity of said arm for guiding a second metal tape into contact with said bar, means for bending said cantilever in a direction such as to urge the roll carried thereby toward said fixed roll, electrical means including brush means mounted independently of said cantilever arm and pivotal toward and away from said rolls for applying an electrical potential across said rolls, resilient means included in said electrical means for urging said brush means toward said rolls, and latch means for holding said electrical means adjacent said rolls whereby said resilient means urges said brush means into electrical contact with said rolls.

References Cited in the file of this patent

UNITED STATES PATENTS

| | | |
|---|---|---|
| 1,234,365 | Makowski | July 24, 1917 |
| 1,308,778 | Gravell | July 8, 1919 |
| 1,761,458 | Von Henke | June 3, 1930 |
| 2,236,707 | Darner et al. | Apr. 1, 1941 |
| 2,288,184 | Dodson | June 30, 1942 |
| 2,330,055 | Hallaway | Sept. 21, 1943 |
| 2,671,155 | Lees | Mar. 2, 1954 |
| 2,688,065 | Clark | Aug. 31, 1954 |
| 2,766,370 | Gillette | Oct. 9, 1956 |